United States Patent [19]

Silverman

[11] 4,300,611
[45] Nov. 17, 1981

[54] HAMPERS WITH IMPROVED LIFTING APPARATUS

[76] Inventor: Max Silverman, 3850 Sedgwick Ave., New York, N.Y. 10463

[21] Appl. No.: 128,724

[22] Filed: Mar. 10, 1980

Related U.S. Application Data

[62] Division of Ser. No. 57,454, Jul. 13, 1979, Pat. No. 4,244,410.

[51] Int. Cl.³ .............................................. B65D 90/20
[52] U.S. Cl. ...................................... 150/51; 108/136; 312/71
[58] Field of Search ................... 150/50, 51; 221/271; 414/416, 417; 312/71; 108/136; 220/93

[56] References Cited

U.S. PATENT DOCUMENTS

| | | | |
|---|---|---|---|
| 2,411,643 | 11/1946 | Turner | 150/50X |
| 2,717,085 | 9/1955 | Waddington | 312/71 X |
| 3,168,271 | 2/1965 | Deschenes | 248/129 |
| 3,215,182 | 11/1965 | Silverman | 150/51 |
| 3,310,089 | 3/1967 | Silverman | 150/51 |

Primary Examiner—Donald F. Norton
Attorney, Agent, or Firm—Friedman, Goodman & Teitelbaum

[57] ABSTRACT

A hamper of the type having a base with an upper perimetric frame supported on the base, and a sack whose mouth is mounted on the upper frame so that the sack depends therefrom in an extended condition. The lifting apparatus includes a rigid member associated with a lower portion of the sack and extending transversely across the sack. A rope mechanism is coupled to the rigid member and extends upwardly over an edge of the upper frame for raising the rigid member towards the mouth as the cord is pulled over the frame edge. Springs act on the rigid member for upwardly biasing the rigid member towards the mouth. The rigid member can be secured to a lower portion of the sack for raising the lower portion of the sack itself, or it can be provided as a separate platform for insertion within the sack for raising the platform within the sack.

8 Claims, 10 Drawing Figures

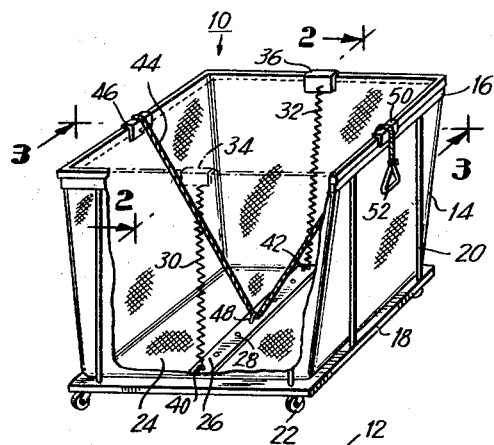

HAMPERS WITH IMPROVED LIFTING APPARATUS

This is a division of application Ser. No. 57,454, filed July 13, 1979, now U.S. Pat. No. 4,244,410.

BACKGROUND OF THE INVENTION

This invention relates to hampers, and more particularly to a hamper having a mechanism which permits lifting of the bottom of the hamper upwardly toward the mouth of the hamper.

Hampers of these types are useful in post office mail sorting operations, laundries, and other places in industry where a supply of articles to be worked on is near a standing operator who must dig his hand into the hamper to remove the objects. It is apparent that articles present near the top of the sack are readily accessible to the operator. However, as the load is depleted, it becomes necessary for the operator to continuously reach down into the sack in order to obtain its contents.

Various attempts have been made in the prior art to bring the sack contents near the bottom of the sack upward toward the mouth region by raising the sack bottom. For example, in my U.S. Pat. No. 3,310,089, I described a hamper having a frame with a sack depending from the frame. A horizontal ring is positioned around the peripheral wall of the sack spaced between its mouth and its bottom. Ropes are connected to opposite sides of the ring and pass upwardly and to the upper edge of the frame. The ropes can be pulled over the frame edge thereby raising the ring so that the portion beneath the ring is brought upwardly toward the mouth of the sack.

In my U.S. Pat. No. 3,215,182, there is provided another type of a hamper also utilizing rope for aiding in bringing the lower portion of the hamper upward towards its mouth. In that patent, a transverse bar is placed along the bottom of the sack and a rope arrangement is interconnected between the bar and the upper frame using a pulley and tackle arrangement. The rope passes over the upper edge of the frame. As the rope is pulled over the edge, the transverse bar is pulled upwardly to bring the bottom of the sack towards the mouth.

In both of these arrangements, the amount of rope necessary to pull the bottom upward is quite considerable. This is especially the case when dealing with heavy loads which are to be placed into the hampers. Because of such heavy loads, a pulley arrangement must be utilized in order to achieve a sufficient mechanical advantage. In order to achieve this mechanical advantage, the length of the rope drawn over the frame edge is quite considerable. The length of rope produces a disadvantage in that the rope has a tendency of getting tangled, sprawling, and causing accidents. Alternately, the rope must be gathered up and dropped into the container in order to avoid possible tripping accidents, but then the rope itself gets lost and is inaccessible for use.

Other prior art arrangements which have tried to bring the bottom of the sack upward towards its mouth have utilized springs. Such springs bias the bottom of the sack upwardly. By way of example, U.S. Pat. No. 2,411,643, discloses a complex bobbin receiver having a flat bottom plate which is connected to elastics located within the bag. U.S. Pat. No. 3,168,271 discloses a clothes hamper having springs located within each of its supporting posts and projects partially into base legs so that the bag support is constantly biased upwardly by the force of the springs.

One problem with using biasing springs concerns the adjustment of the springs to the type of weight to be received. For example, if a spring of a fixed tension is utilized, the device can only raise or lift a limited range of contents. A low tension spring will lift only contents of light weight. A high tension spring will lift contents of heavy weight. A platform with a low tension spring will not be able to raise a heavy load. On the other hand, a platform supported by a high tension spring cannot be depressed by lightweight objects thrown into it. As a result, a continuous supply of such lightweight objects will not lower the bottom of the hamper and the hamper will not be able to be filled.

This problem is especially important in the case of hampers being used in connection with mail sorting operations. The size and weight of the packages and envelopes thrown into the hampers vary greatly. In some cases, heavy packages are placed into the sack which would tend to push the spring supported sack down to its extended position and prevent reaching the heavy packages. On the other hand, frequently only light weight packages are thrown in, and the sack will hardly lower at all so the bottom of the sack will continuously remain in its upward raised position.

Accordingly, prior art hampers have been most awkward in their ability to accommodate both heavy and light loads, and at the same time to permit the bottom of the sack to be brought upward near the mouth of the sack to facilitate utilization of the sack by means of the operator.

Still a further problem concerns the ability to modify existing hampers in order to permit them to have the raisability feature. Most hampers having lifting apparatus require that the lifting apparatus be included directly within the original manufacture of the hamper. For example the aforementioned patents utilizing biasing springs all require that the springs be included within portions of the supporting frame and accordingly the basic hamper itself must be originally manufactured with the springs. It is not feasible to modify an existing hamper in order to receive the springs of the aforementioned prior art designs. As a result, any existing hampers without a suitable lifting apparatus cannot be modified in order to permit the lower portion of the sack to be raised when weighted down by loads of wide ranging weights.

SUMMARY OF THE INVENTION

It is accordingly an object of the present invention to provide a hamper having a lifting apparatus which avoids the aforementioned problems of prior art devices.

Still another object of the present invention is to provide a hamper having a lifting apparatus which combines the benefits of both lifting ropes and biasing springs in order to facilitate raising of the bottom portion of the sack.

Still a further object of the present invention is to provide a hamper which includes a sack depending from an upper frame, and which includes a lifting apparatus to permit the bottom of the sack to be raised upwards toward the mouth of the sack.

Yet a further object of the present invention is to provide a lifting apparatus for hampers, which will permit modifying existing hampers to permit raising of the bottom to thereby facilitate taking out objects from the bottom of the sack.

Still a further object of the present invention is to provide a novel and improved hamper having the aforementioned features and which is simple in structure, easy to manipulate, efficient in carrying out its purpose, and reduced in cost.

Briefly, in accordance with the present invention, there is provided a hamper having a base with an upper perimetric frame supported on the base. A sack whose mouth is mounted on the upper frame depends from the frame in an extended condition. A rigid member is secured to a lower portion of the sack and extends transversely across the sack. A rope mechanism is coupled to the rigid member and extends upwardly and over an edge of the upper frame, for raising the lower portion of the sack towards the mouth of the sack as the rope is pulled over the frame edge. A spring device acts on the rigid member for upwardly biasing the rigid member toward the mouth.

In an embodiment of the invention, the rigid member comprises a bar secured across the bottom of the sack. The rope has one end thereof coupled to a side edge of the upper frame. The other end thereof passes over an opposing side edge of the upper frame. The rope intermediate of its opposing ends is slidably coupled to the bar. In this manner, as the other end of the rope is pulled, the bar is raised upwardly to thereby bring the bottom of the sack towards the mouth of the sack. The spring device also acts on the bar for upwardly biasing the bar toward the mouth.

In another embodiment of the invention, the rigid member comprises a perimetric bar secured to the peripheral sack wall, spaced below the upper frame and substantially parallel thereto. The rope mechanism comprises a pair of ropes, with each rope connected to respective opposing sides of the perimetric bar. Each rope extends upwardly and passes over an edge of the corresponding side of the upper frame. In this manner, as the pair of ropes are pulled over their respective frame edges, the perimetric bar is raised to the region of the mouth of the sack, wherein the sack portion beneath the perimetric bar serves as a receptacle whose mouth is accessible at the mouth region of the sack. Here again, the spring device acts on the perimetric bar for upwardly biasing the perimetric bar toward the mouth.

The lifting apparatus can be made independent of the hamper, whereby it can be later inserted into existing hampers to modify the hampers permitting them to have their bottom portions raised. Specifically, the lifting platform can include a platform member for insertion within the sack. A rope mechanism having one end adapted for connection at one side edge of the upper frame, and the other end of the rope available for passing over the edge of an opposing side of the upper frame. The portion of the rope intermediate its ends, is slidably coupled transversely across the platform member. Again, spring devices act on the platform member for upwardly biasing the platform member toward the upper frame.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawing:

FIG. 1 is a partially cut away perspective view of a hamper showing a first embodiment of the present invention, with the sack in its fully distended position.

FIG. 2 is a side sectional view taken along line 2—2;

FIG. 3 is a sectional view taken along line 3—3, and perpendicular to the view shown in FIG. 3 but showing the sack in a partially raised position;

In the various figures of the drawing, like reference characters designate like parts.

DESCRIPTION OF THE PREFERRED EMBODIMENTS

Figure 4:
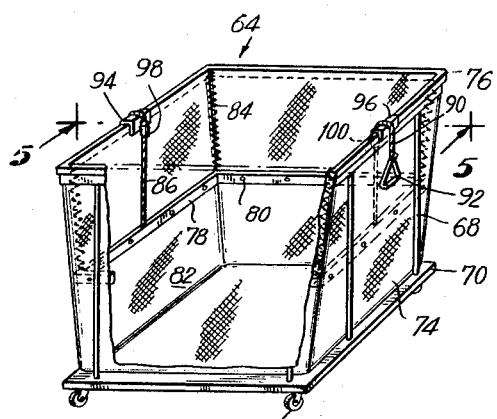
FIG. 4 is a partially out away perspective view of a hamper showing a second embodiment of the second invention, with the sack in its fully distended position.

Referring now to FIGS. 1-3, there is shown a first embodiment of the hamper of the present invention. The hamper is shown generally at 10 and includes an upper frame 12 from which is depended a sack 14. The mouth of the sack includes an upper frame 12 from which is depended a sack 14. The mouth of the sack includes a hem 16 folded over the upper frame 12 and fastened by means of known methods. For example, the mouth rim zone could be provided with spaced eyelets arranged in vertically spaced rows so that the eyelets of one row are in vertical alignment with the eyelets of the next row. The edge is then folded over and a cord is passed through the aligned eyelets whereby the cord is threaded around to secure the sack onto the upper frame.

The upper frame itself is supported above a base 18 by means of vertical rods or struts 20 so that the upper frame 12 is substantially parallel to the base. Rollers or casters 22 depend from the base 18 to permit movement of the hamper.

The base 18 is of substantially rectangular configuration and the upper frame 12 is also of substantially rectangular configuration and is slightly larger than the base. The sack itself is also rectangular. However, the sack tapers slightly downwardly so that the bottom portion is of smaller cross sectional area than the upper portion. In its distended position, the bottom wall 24 of the sack almost reaches the base 18.

Positioned transversely across the bottom wall 24 is a rigid bar 26 which is fastened by known means, such as the rivets 28. Connected to the opposing lateral ends of the rigid bar 26 are springs 30, 32. The upper end of each spring is connected to the frame 12 by means of the clamps or saddles 34, 36. Each saddle 34, 36 fits over the frame itself as well as on to the sack material covering the frame, and is secured in place by means of rivets or other securing material. The lower end of each spring is securely retained onto the rigid bar by means of the respective hooks 40, 42. The upper end of the springs are connected proximate the mid points of opposing sides of the upper frame.

Connected proximate the midpoint of the other opposing sides of the upper frame is a rope mechanism including the rope 44, fastened at one end to the frame by means of a saddle or clamp 46. The rope 44 then extends downwardly until it reaches the proximate mid-point of the rigid bar 26 where it passes through a U-shaped clamp 48. The rope then travels upwardly over the opposing side of the upper frame. It is slidably held by means of the saddle 50 and terminates downwardly over the edge of the saddle in a pull handle 52.

Positioned along the rope 44 and adjacent to the saddle 50 is a releasable cord lock 54 (shown in FIG. 3) of a type well known in the art. Any releasable cord may be used, wherein the cord is locked in place and can be released by means of a slight withdrawal or other simple movement. For example, in one such arrangement the cord is engaged by steel balls in a chuck-like manner where the balls are made to approach each other in a frustroconical section of the cord lock body. However, other known arrangements can be utilized for this purpose.

The springs are maintained in their normal compressed position, as shown in FIG. 3. In this position, the bottom of the sack is raised to the height biased by the springs. The springs bring up the rigid bar which causes the center portion of the sack to be brought upwardly forming the two looped sections 56, 58 on either side of the rigid bar. In this position, packages such as the ones shown in dotted lines 60, 62 can be placed into the sack. For light packages, the spring will provide sufficient biasing to counter the weight of the packages so that the bottom of the sack will remain in its raised position as shown in FIG. 3. As the number of packages in the sack increases, or should there be heavy packages, the weight will be sufficient to counter the biasing force of the springs and the sack will be lowered to its distended position, as shown in FIG. 1.

In this position, the sack will be able to continually receive additional packages until it is filled. At that time, it is possible to remove the packages adjacent the mouth of the sack. Should the weight be sufficiently light, again the lower portion will be raised by means of the springs. However, should there be heavy weighted packages near the bottom which prevent the springs from raising the lower portion of the sack, the rope is used to coact with the springs by pulling on the handle 52 to raise the bottom portion of the sack, thereby providing access to the packages at the bottom.

Once the handle 52 is pulled, as shown by the arrow in FIG. 3, the bottom of the sack will be raised. The cord lock will hold the rope so that the bottom of the sack is held in the desired raised position. By pulling on the rope, it can be released whereby the bottom of the sack is again returned to its biased position, being supported by means of the springs.

Figure 5:
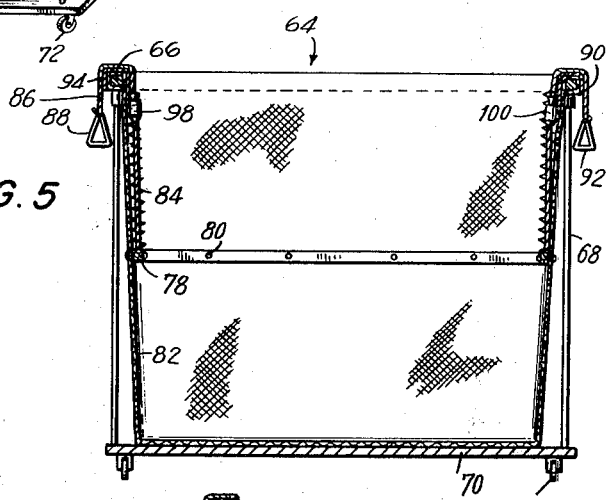
FIG. 5 is a side elevational view taken along line 5—5.
Figure 6:
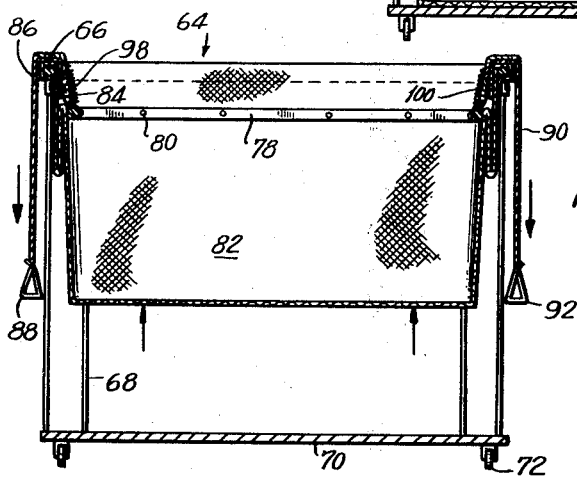
FIG. 6 is a view similar to that of FIG. 5, but showing the sack in a partially raised position.

Referring now to FIGS. 4–6, there is shown another embodiment of the present invention. The hamper, shown generally at 64, comprises an upper frame 66 held by supports 68 in a raised position above a base 70 having rollers 72 depending therefrom. A sack 74 has its upper edge hemmed around the upper frame 66 by means of the hem 76 so that the sack depends from the upper frame. The shape of the frame, base and sack are substantially as described heretofore with regard to FIGS. 1–3. Positioned perimetrically about the sack wall are a series of interconnected bars 78 forming a perimetric ring or frame. The bars 78 defining the frame, can be fastened to the sack wall by means of the rivets 80. The bars 78 forming the ring are spaced below the mouth of the sack and above the base portion. The portion below the bars 78 defines a lower receptacle 82.

In each corner of the sack there is provided a respective spring 84. Each of the four springs extend between the perimetric bars 78 and the upper frame 66. Additionally, a first rope 86 is connected proximate the mid-point of one of the bars 78 and extends upwardly to pass over the edge of the upper frame and then downwardly to terminate in a handle 88. On the opposing side, a corresponding rope 90 is connected at its lower end to a bar 78 and then extends upwardly over its corresponding frame edge and then downwardly to terminate in handle 92. Saddles or clamps 94, 96 are respectively positioned over the upper edge of the frame where the ropes 86, 90 pass thereover in order to provide a guideway for the ropes and permit easy sliding of the ropes over the frame edges.

Normally the springs bias the bars 78 to retain them in an upward position, as shown in FIG. 6. In this position, the lower sack receptacle is brought upward with the perimetric bar 78 brought up adjacent to the mouth of the sack. Packages can then be placed into the sack and, as long as there are only a few packages of light weight, they will be easily reachable since the bottom of the sack is raised. Should a heavy package be placed in the sack, the weight of the heavy package will counter the spring biasing force and will force the sack into its distended position, as shown in FIG. 4. In this position it would normally be difficult to reach the package at the bottom of the sack. However, by means of the ropes, it is possible to pull the bottom of the sack upwardly. Each of the rope handles 88, 92 is pulled, as shown in FIG. 6. This will then raise the perimetric bar 78, bringing the lower receptacle 82 upward adjacent to the mouth of the sack.

In order to hold the ropes, releasable cord locks, of the type described heretofore, can be placed at positions 98, 100 in the path of each of the ropes adjacent to their respective saddles or clamps 94, 96. When it is desired to lower the receptacle 82, the ropes can be released permitting the springs to act in accordance with their normal biasing function.

The lower receptacle 82 can actually be considered a lower sack which has the perimetric bar 78 at its mouth. This lower receptacle can be formed of a separate material, which is attached to the upper sack portion, or, alternately, can be of the same material as the upper sack portion with just the bar 78 placed along the wall to form a separation between the upper and lower portions.

The embodiments heretofore described showed lifting apparatus connected directly to the sack. Such connection is made either by means of the transverse bar across the lower portion as in FIGS. 1–3, or by means of the perimetric bar around the wall as in FIGS. 4–6. However, in many situations hampers are already in use and it would be desirous to provide the lifting capability of the present invention to these existing hampers. For such purpose, reference is made now to FIGS. 7–10 which show lifting apparatus, similar to the type already described, but which can be inserted into existing hampers to modify them so as to permit them to have the same lifting capabilities heretofore described.

Figure 7:
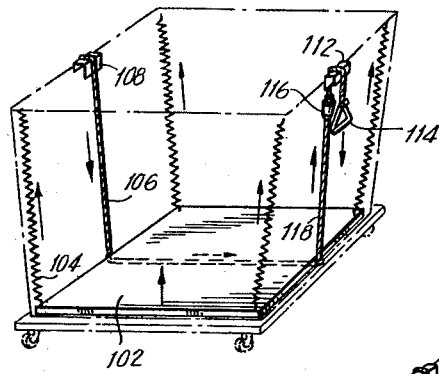
FIGS. 7-10 are schematic views showing lifting apparatus for use with hampers, and wherein each figure shows a different embodiment of such lifting apparatus.

With reference now to FIG. 7, there is shown the lifting apparatus as including a lifting platform 102 having connected thereto springs 104 and a rope 106. The springs extend upwardly from the corners of the platform and are available for connection to the upper frame of a hamper. The rope 106 has one end connected to a saddle or clamp 108 which can fit over an edge of the upper frame. The rope then passes beneath the lifting platform 102 and extends upwardly at the other end at 118 to pass over another saddle 112 and terminates in the handle 114. The saddle 112 would be placed over the edge of an opposing side of the upper frame. A releasable cord lock 116 is positioned along the rope path adjacent to the saddle 112.

The entire lifting apparatus can be inserted within the sack of an existing hamper. Thus, the platform member 102 will fit at the bottom of the sack; the springs will be connected within the sack extending upwardly and connected to the upper frame; the saddles 108, 112 will be placed over the edges of the upper frame, and the apparatus will be ready for use.

In use, the springs will bias the platform 102 upwardly to maintain the platform in a raised position with respect to the mouth for receiving light loads. When a heavy load is placed on the platform, the rope can be used to pull the platform upwardly. As the rope is pulled over the saddle 112, it passes beneath the platform to pull the platform upwardly.

Although the rope is shown as passing under the platform, it is understood that it could also pass over the top of platform through hooks which would be used to slidably retain the rope across the platform.

Figure 8:
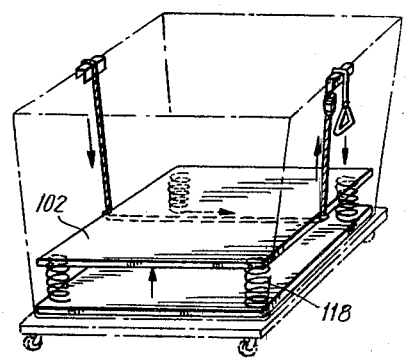

As shown in FIG. 7, the springs extend above the platform for connection upwardly to the upper frame. Such springs would be tension type springs. In FIG. 8 there is shown another embodiment in which the springs 118 depend beneath the platform 102, and are compression type springs. The compression springs are shown placed in the four corners beneath the platform in order to provide a level support for the platform. However, the springs could also be placed in other positions, as for example using three springs placed transversely across the middle section of the platform. Similarly, with respect to FIG. 7 other arrangements of springs could be utilized so long as they provide the necessary upward biasing force. The springs in FIG. 8 would extend between the platform and the base of the hamper.

Figure 9:
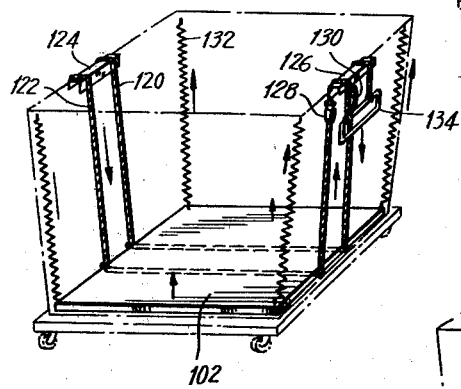
Figure 10:
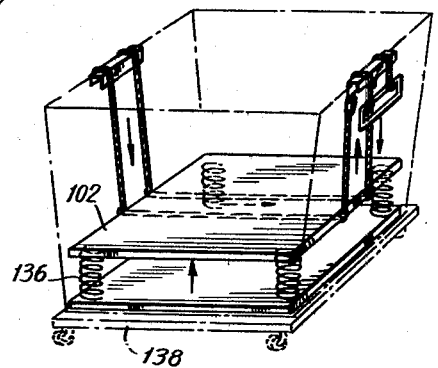

In FIG. 9 there is another embodiment showing a different rope arrangement. As shown, a pair of ropes 120, 122 are used. The ropes pass in parallel downwardly from their connection at the upper clamp or saddle 124, then they pass in parallel beneath the platform 102, and continue upwardly as a parallel pair extending over the tope of the clamp 126. The ropes terminate at their end in a common bar 134 which is used to operate both of the ropes simultaneously. By means of the double rope arrangement it is easier to lift the platform 102 into its upward position because the two ropes will provide a better balancing arrangement than the single rope of the previous embodiments. Two cord locks 128, 130 are utilized respectively for the ropes 120, 122. In the embodiment shown in FIG. 9, four springs 132 are placed respectively in the corners and extend upwardly for connection to the upper frame to act in a manner set forth above.

In FIG. 10, again a pair of ropes are shown. However, the upwardly extending tension springs of FIG. 9 are replaced with compression springs 136 depending beneath the platform 102. The platform 102 would be inserted within the sack and the springs would exert an upward biasing force extending between the base 138 of the hamper and the platform 102.

The ropes can be attached to the platform through loops, rings, pulleys or tubes attached to either the top or the under surface of the platform.

In the embodiments used heretofore in connection with the present invention, low tension springs are used which will not prevent the platform from depressing to allow the container to accommodate light loads. Such light loads will be raised without the additional manual force of the rope. However, for heavier loads, the rope will be utilized to bring up the bottom.

There has been described heretofore the best embodiments of the invention presently contemplated. However, it is to be understood that various changes and modifications may be made thereto without departing from the spirit of the invention.

What is claimed is:

1. A lifting platform for use in a hamper having a rigid upper frame and a sack, the mouth of the sack mounted on the upper frame whereby the sack depends therefrom, said lifting platform comprising a platform member for insertion within the sack, rope means having one end available for connection at one side of the upper frame, the other end of the rope means available for passing over the edge of an opposing side of said upper frame, and a portion of the rope means intermediate its ends slidably coupled across said platform member, whereby when said other end of the rope means is pulled over the frame edge, said platform member is raised towards said upper frame, and spring means acting on said platform member for upwardly biasing said platform member towards said upper frame.

2. A lifting apparatus as in claim 1, wherein said spring means comprises tension springs for coupling between said upper frame and said platform member.

3. A lifting apparatus as in claim 2, wherein said platform member is of substantially rectangular configuration, and said spring means comprises four tension springs positioned at respective corners thereof.

4. A lifting apparatus as in claim 1, wherein said hamper further comprises a base supporting said upper frame, the bottom of the sack resting on said base, and wherein said spring means comprises compression springs depending from said platform member for extending between said base and said platform member.

5. A lifting apparatus as in claim 1, wherein said rope means comprises a pair of spaced apart parallel cables coupled to one side of the frame and extending downwardly therefrom towards said platform member, then transversely across said platform member and upwardly towards the opposing side of said upper frame, and then downwardly over the edge of said opposite side frame.

6. A lifting apparatus as in claim 5, and further comprises a single handle means for simultaneously operating both said parallel cables to pull them over said side frame edge.

7. A lifting apparatus as in claim 1, wherein said rope means passes beneath said platform member.

8. A lifting apparatus as in claim 1, and further comprising a first saddle secured over an edge of said one side of said upper frame and under said one end of said rope means, means fixedly securing said one end of said rope means to said first saddle, a second saddle secured over the edge of said opposing side of said upper frame and under said other end of said rope means, and means slidably securing said other end of said rope means to said second saddle.

* * * * *